United States Patent
Jia et al.

(10) Patent No.: US 8,970,979 B1
(45) Date of Patent: Mar. 3, 2015

(54) DISK DRIVE DETERMINING FREQUENCY RESPONSE OF ACTUATOR NEAR SERVO SAMPLE FREQUENCY

(71) Applicant: Western Digital Technologies, Inc., Irvine, CA (US)

(72) Inventors: Qing Wei Jia, Singapore (SG); Hui Li, Singapore (SG); Shuyu Cao, Singapore (SG); Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/133,417

(22) Filed: Dec. 18, 2013

(51) Int. Cl.
*G11B 5/596* (2006.01)

(52) U.S. Cl.
CPC .................................. *G11B 5/59622* (2013.01)
USPC .......... 360/55; 360/75; 360/78.05; 360/77.04

(58) Field of Classification Search
None
See application file for complete search history.

(56) References Cited

U.S. PATENT DOCUMENTS

| | | | |
|---|---|---|---|
| 5,654,841 A | 8/1997 | Hobson et al. | |
| 6,014,283 A | 1/2000 | Codilian et al. | |
| 6,034,834 A * | 3/2000 | Yoshikawa et al. | 360/75 |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |

(Continued)

OTHER PUBLICATIONS

Rick Ehrlich, Carl Taussig, Daniel Abramovitch, "Identification of Sampled Data Systems at Frequencies Beyond the Nyquist Rate," In the Proceedings of the 1989 IEEE Conference on Decision and Control in Tampa, FL, Dec. 1989.

(Continued)

*Primary Examiner* — Wayne Young
*Assistant Examiner* — James L Habermehl

(57) ABSTRACT

A disk drive is disclosed comprising a servo control system configured to control an actuator for actuating a head over a disk. Servo sectors are sampled at a servo sample frequency $f_s$ to generate a position error signal PES(k) that is filtered with a compensator to generate a first control signal u1(k). A first discrete-time sinusoid comprising a sinusoid frequency of $f_s+\Delta f$ is added to the first control signal u1(k) to generate a second control signal u2(k). The second control signal u2(k) is applied to the actuator, and a frequency response of the actuator is determined at the frequency $|\Delta f|$. The frequency response of the actuator is determined at the frequency $f_s+\Delta f$ based at least in part on the frequency response of the actuator at the frequency $|\Delta f|$ and a measured signal of the servo control system when applying the second control signal u2(k) to the actuator.

22 Claims, 4 Drawing Sheets

(56) References Cited

U.S. PATENT DOCUMENTS

| | | |
|---|---|---|
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,606,213 B1 | 8/2003 | Ooi et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,643,080 B1 | 11/2003 | Goodner, III et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,937,424 B2 * | 8/2005 | Chang et al. ............... 360/77.04 |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,970,321 B2 * | 11/2005 | Hsin et al. ....................... 360/75 |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,031,094 B2 * | 4/2006 | Chung ............................ 360/75 |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,079,338 B1 * | 7/2006 | Semba et al. ................. 360/75 |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,193,799 B2 * | 3/2007 | Chung ............................ 360/46 |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |

(56) References Cited

U.S. PATENT DOCUMENTS

| | | |
|---|---|---|
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,474,496 B1 * | 1/2009 | Sun et al. .................. 360/75 |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,660,701 B2 | 2/2010 | Sharpe, Jr. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 * | 8/2012 | Tang .................. 360/78.05 |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 * | 12/2013 | Xi et al. .................. 360/78.05 |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |

(56) References Cited

U.S. PATENT DOCUMENTS

| | | |
|---|---|---|
| 8,797,664 B1 | 8/2014 | Guo et al. |
| 8,804,267 B2 | 8/2014 | Huang et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Qingwei Jia, et. al., U.S. Appl. No. 13/585,679, filed Aug. 14, 2012, 15 pages.

* cited by examiner

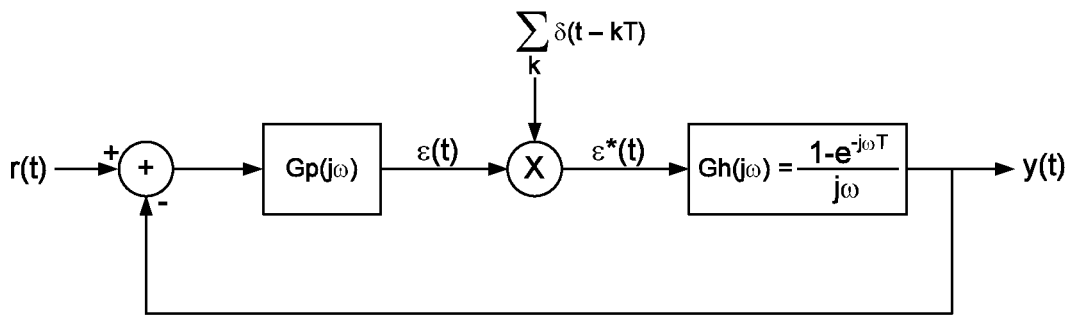

FIG. 3A $$Y(j\omega) = Gh(j\omega)E^*(j\omega)$$

$$E^*(j\omega) = \frac{[Gp(j\omega)R(j\omega)]^*}{1 + [Gp(j\omega)Gh(j\omega)]^*}$$

$$Y(j\omega) = \frac{Gh(j\omega)[Gp(j\omega)R(j\omega)]^*}{1 + [Gp(j\omega)Gh(j\omega)]^*}$$

$$H_{eff}(j\omega) = \frac{Y_0}{R_0} = \frac{Gp(j\omega)R(j\omega)}{1 + [Gp(j\omega)Gh(j\omega)]^*} \cdot \frac{1}{T}$$

$$H_\Sigma(j\omega) = \sum_k H_{eff}(j[\omega - k\omega_s]) = \frac{[Gp(j\omega)Gh(j\omega)]^*}{1 + [Gp(j\omega)Gh(j\omega)]^*}$$

$$Gp(j\omega)Gh(j\omega) \cdot \frac{1}{T} = \frac{H_{eff}(j\omega)}{1 - H_\Sigma(j\omega)}$$

FIG. 3B $$P(f_s+\Delta f) = \frac{PES(|\Delta f|)}{S_2(|\Delta f|)} (1 + P(|\Delta f|)C(|\Delta f|))$$

$$S_2(|\Delta f|) = DFT(A_0 Sin(2\pi(f_s + \Delta f)kT_s))$$

$$P(f_s+\Delta f) = \frac{U1(|\Delta f|)}{S_2(|\Delta f|)} \left[ \frac{1 + P(|\Delta f|)C(|\Delta f|)}{C(|\Delta f|)} \right]$$

$$P(f_s+\Delta f) = \frac{U1(|\Delta f|)}{S_2(|\Delta f|)} P(|\Delta f|)$$

DISK DRIVE DETERMINING FREQUENCY RESPONSE OF ACTUATOR NEAR SERVO SAMPLE FREQUENCY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 3A represents a closed-loop sampled servo control system according to an embodiment.

FIG. 3B illustrates an embodiment for deriving the effective transfer function of the closed-loop sampled servo control system.

DETAILED DESCRIPTION

Figure 2A:
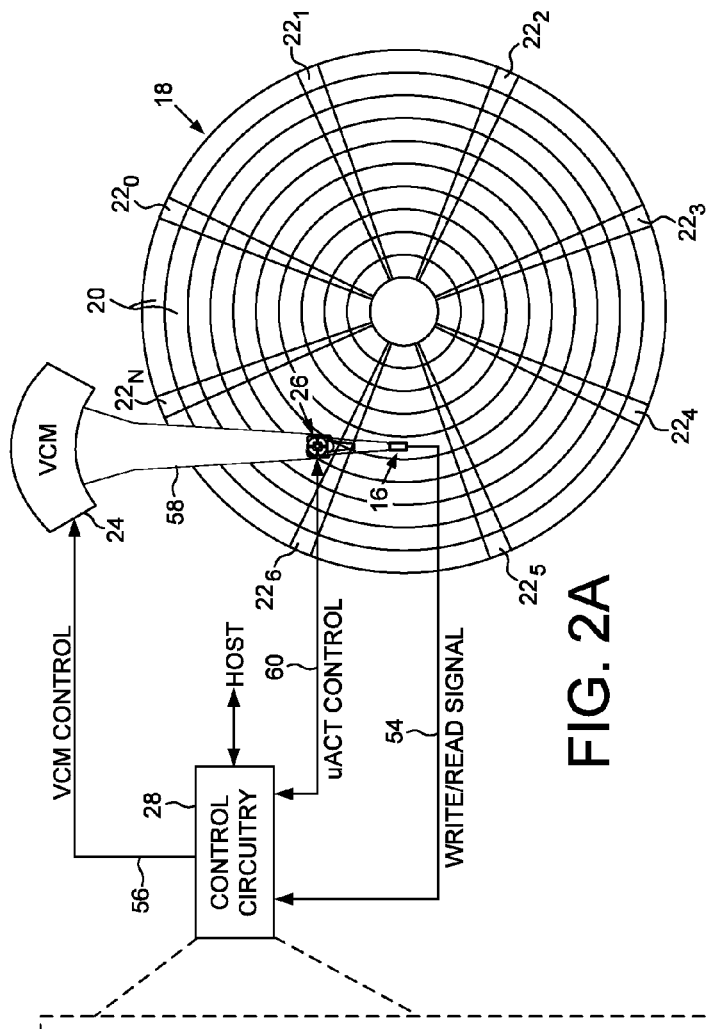
FIG. 2A shows a disk drive according to an embodiment comprising a head actuated over a disk by an actuator comprising a frequency response.

FIG. 2A shows a disk drive according to an embodiment comprising a head 16, a disk 18 comprising a plurality of servo tracks 20, wherein each servo track comprises a plurality of servo sectors $22_0$-$22_N$. The disk drive further comprises an actuator (e.g., voice coil motor (VCM) 24 and/or a microactuator 26) configured to actuate the head 16 over the disk 18, wherein the actuator comprises a frequency response. The disk drive further comprises control circuitry 28 comprising a servo control system (FIG. 2B) configured to control the actuator. The control circuitry 28 is configured to execute the flow diagram of FIG. 2C, wherein the servo sectors are sampled at a servo sample frequency $f_s$ to generate a position error signal PES(k) 30 (block 32). The PES(k) 30 is filtered with a compensator C(z) 34 to generate a first control signal u1(k) 36 (block 38). A first discrete-time sinusoid 40 comprising a sinusoid frequency of $f_s+\Delta f$ is added to the first control signal u1(k) 36 to generate a second control signal u2(k) 42 (block 44), wherein the second control signal u2(k) 42 is applied to the actuator P(s) 46 (block 48). The frequency response of the actuator P(s) 46 is determined at the frequency $|\Delta f|$ (block 50). The frequency response of the actuator P(s) 46 is determined at the frequency $f_s+\Delta f$ based at least in part on the frequency response of the actuator P(s) 46 at the frequency $|\Delta f|$ and a measured signal of the servo control system when applying the second control signal u2(k) 42 to the actuator P(s) 46 (block 52).

Figure 1:
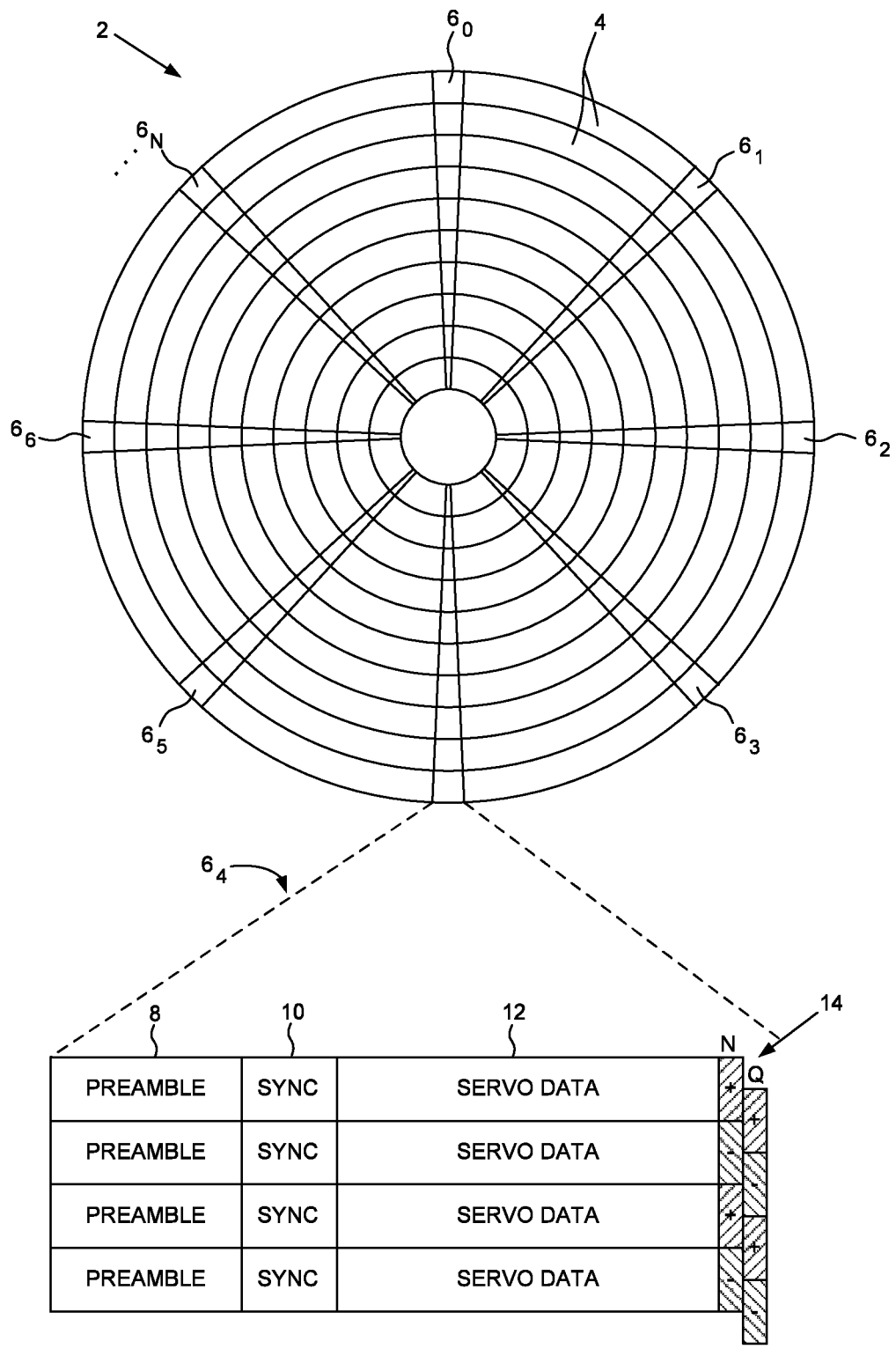
FIG. 1 shows a prior art disk format comprising a plurality of servo tracks defined by servo sectors.

In the embodiment of FIG. 2A, the control circuitry 28 processes a read signal 54 emanating from the head 16 to demodulate the servo sectors $22_0$-$22_N$ to generate an actual position of the head that is subtracted from a reference position to generate the PES(k) 30. The control circuitry 28 generates a control signal 56 applied to the VCM 24 which rotates an actuator arm 58 about a pivot to actuate the head 16 radially over the disk 18 in coarse movements. In one embodiment, the control circuitry 28 may also generate a control signal 60 applied to a microactuator 26 to actuate the head 16 over the disk 18 in fine movements. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, it may be desirable to measure a frequency response of the actuator P(s) 46 for actuating the head 16 over the disk 18 in order, for example, to identify resonant frequencies of the actuator P(s) 46. In one embodiment, the servo control system may be modified based on the identified resonant frequencies, such as by adding and/or modifying notch filters that attenuate the frequency response at the resonant frequencies. In another embodiment, the identified resonant frequencies may be used to identify defective servo components, such as a defective VCM 24 or microactuator 26, so that the disk drive may be discarded or reworked to replace the defective components.

Any suitable technique may be employed to measure the frequency response of the actuator P(s) 46. In one embodiment, the control circuitry 28 executes a signal processing algorithm capable of measuring the frequency response of the servo control system at frequencies higher than half the second servo sample frequency. Such a signal processing algorithm may include an anti-aliasing multi-rate (Nx) bode algorithm which is understood with reference to FIGS. 3A and 3B. FIG. 3A represents a closed-loop sampled servo control system where $G_p(j\omega)$ represents the plant under test (e.g., a compensator $C(z)$ and actuator $P(s)$), $r(t)$ represents a reference input, $y(t)$ represents the sampled output (e.g., the PES measured at each servo sector), and $Gh(j\omega)$ represents a zero order hold function. In one embodiment, the frequency response of the closed-loop servo control system shown in FIG. 3A is measured at discrete frequencies (e.g., frequency $\omega_0$) by injecting a sinusoid having a frequency $\omega_0$ as the reference input $R(j\omega)$. The effective transfer function Heff $(j\omega)$ may be derived as shown in FIG. 3B where T represents the servo sample period. The term $H_x(j\omega)$ represents the discrete-time transfer function of the closed-loop system evaluated at $z=e^{j\omega T}$, and $\omega_s$ represents the servo sample frequency. Since the effective transfer function Heff($j\omega$) does not exhibit aliasing (anti-aliasing) it may be measured at any frequencies, including frequencies beyond half the servo sample frequency (the Nyquist frequency). However, when using the above-described multi-rate (Nx) bode algorithm, the frequency response is undefined when the frequency of the reference input $R(j\omega)$ is proximate an integer multiple of the servo sample frequency ($k\omega_s$).

Figure 2B:
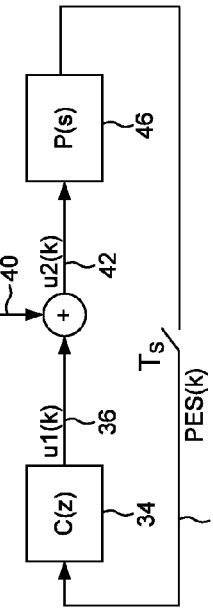
FIG. 2B shows a servo control system according to an embodiment wherein a discrete-time sinusoid comprising a sinusoid frequency of $f_s+\Delta f$ is added to a first control signal u1(k) to generate a second control signal u2(k).
Figure 2C:
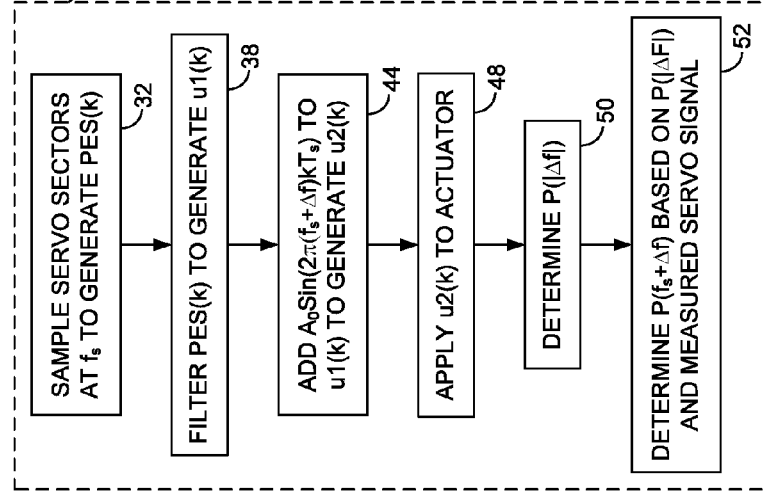
FIG. 2C is a flow diagram according to an embodiment for determining a frequency response of the actuator at the frequency $f_s+\Delta f$ based at least in part on the frequency response of the actuator at the frequency $|\Delta f|$ and a measured signal of the servo control system when applying the second control signal u2(k) to the actuator.
Figures 4A, 4B, 4C, 4D:
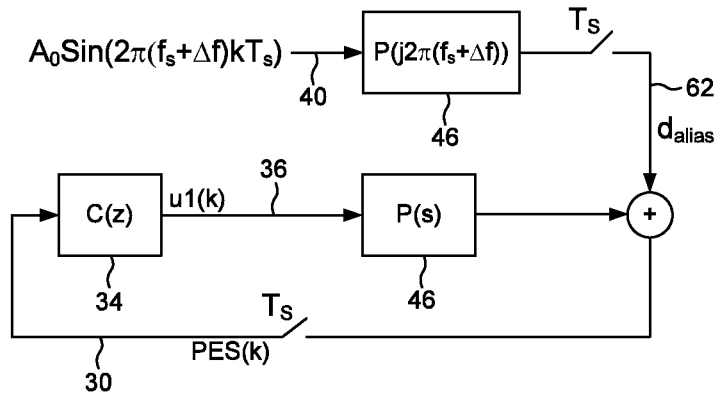
FIG. 4A shows an equivalent system to FIG. 2B when evaluated relative to a position error signal PES(k) of the servo control system.
FIG. 4B shows an embodiment for determining a frequency response of the actuator at the frequency $f_s+\Delta f$ based on the PES(k) of the servo control system.
FIG. 4C shows an embodiment for determining a frequency response of the actuator at the frequency $f_s+\Delta f$ based on the first control signal u1(k).
FIG. 4D shows an alternative embodiment for determining a frequency response of the actuator at the frequency $f_s+\Delta f$ based on the first control signal u1(k).

Accordingly, in one embodiment the frequency response of the actuator $P(s)$ 46 may be measured proximate the servo sample frequency by injecting a discrete-time sinusoid 40 comprising a sinusoid frequency of $f_s+\Delta f$ into the servo control system as shown in FIG. 2B. FIG. 4A shows an equivalent system to FIG. 2B when evaluated relative to the PES(k) 30. Due to the sampler in FIG. 4A, injecting the discrete-time sinusoid 40 as shown in FIG. 2B results in an alias signal $d_{alias}$ 62 being fed back to the compensator $C(z)$ 34 of the form:

$$d_{alias} = A_0 |P(j2\pi(f_s+\Delta f))| \sin(2k\pi\Delta f T_s + \alpha) \quad (1)$$

where $\alpha$ represents the phase response of $P(j2\pi(f_s+\Delta f))$. When injecting the discrete-time sinusoid 40 as shown in FIG. 2B, the alias signal $d_{alias}$ 62 may be calculated by measuring the PES(k) 30:

$$d_{alias} = (1+P(j2\pi|\Delta f|)C(j2\pi|\Delta f|))PES \quad (2)$$

or by measuring the first control signal u1(k) 36:

$$d_{alias} = X(j2\pi|\Delta f|)U1 \quad (3)$$
$$X(s) = (1+P(s)C(s))/C(s)$$

By equating the above equation (1) and equation (2), the frequency response of the actuator $P(s)$ 46 at the frequency $f_s+\Delta f$ may be determined according to the equation shown in FIG. 4B:

$$P(f_s+\Delta f) = \frac{PES(|\Delta f|)}{S_2(|\Delta f|)}(1+P(|\Delta f|)C(|\Delta f|))$$

where $P(f_s+\Delta f)$ represents the frequency response of the actuator at the frequency $f_s+\Delta f$, PES($|\Delta f|$) represents the frequency domain representation of the PES(k) at the frequency $|\Delta f|$ when applying the second control signal u2(k) to the actuator, $S_2(|\Delta f|)$ represents a frequency domain representation of a second discrete-time sinusoid at a sinusoid frequency of $|\Delta f|$, $P(|\Delta f|)$ represents the frequency response of the actuator at the frequency $|\Delta f|$, and $C(|\Delta f|)$ represents a frequency response of the servo compensator at the frequency $|\Delta f|$.

By equating the above equation (1) and equation (3), the frequency response of the actuator $P(s)$ 46 at the frequency $f_s+\Delta f$ may be determined according to the equation shown in FIG. 4C:

$$P(f_s+\Delta f) = \frac{U1(|\Delta f|)}{S_2(|\Delta f|)}\left[\frac{1+P(|\Delta f|)C(|\Delta f|)}{C(|\Delta f|)}\right]$$

where $P(f_s+\Delta f)$ represents the frequency response of the actuator at the frequency $f_s+\Delta f$, U1($|\Delta f|$) represents the frequency domain representation of the first control signal u1(k) at the frequency $|\Delta f|$ when applying the second control signal u2(k) to the actuator, $S_2(|\Delta f|)$ represents a frequency domain representation of a second discrete-time sinusoid at a sinusoid frequency of $|\Delta f|$, $P(|\Delta f|)$ represents the frequency response of the actuator at the frequency $|\Delta f|$, and $C(|\Delta f|)$ represents a frequency response of the servo compensator at the frequency $|\Delta f|$. When $|\Delta f|$ is a low frequency, $|P(s)(C(s)| \gg 1$ such that $X(s) \approx P(s)$ and therefore the frequency response of the actuator $P(s)$ 46 at the frequency $f_s+\Delta f$ may be determined according to the equation shown in FIG. 4D:

$$P(f_s+\Delta f) = \frac{U1(|\Delta f|)}{S_2(|\Delta f|)}P(|\Delta f|).$$

Any suitable technique may be used to measure $P(|\Delta f|)$ representing the frequency response of the actuator $P(s)$ 46 at the frequency $|\Delta f|$, and $C(|\Delta f|)$ representing the frequency response of the servo compensator $C(z)$ 34 at the frequency $|\Delta f|$. In one embodiment, the above described anti-aliasing multi-rate (Nx) bode algorithm may be used to measure the frequency response $P(|\Delta f|)$. However, any suitable algorithm may be employed, including any convention technique for measuring a frequency response of the actuator $P(s)$ 46 at the frequency $|\Delta f|$. In one embodiment, the term $(1+P(|\Delta f|)C(|\Delta f|))$ in the above equations may be estimated by adding a sinusoid at the frequency $|\Delta f|$ to the first control signal u1(k) and evaluating the resulting PES.

Any suitable non-zero value may be selected for the frequency $\Delta f$ which may be a negative or positive value. In one embodiment, the frequency $\Delta f$ may be varied from a negative value through zero to a positive value in order to measure the frequency response of the actuator $P(s)$ 46 over a range of frequencies near the servo sample frequency $f_s$. In one embodiment, a frequency response of the actuator $P(s)$ 46 may be determined using a conventional algorithm or using the above described anti-aliasing multi-rate (Nx) bode algorithm for frequencies excluding a band near the servo sample frequency $f_s$, and then the frequency response may be determined for the missing band using the above described algorithm.

In the embodiments described above, the servo control system such as shown in FIG. 2B processes the discrete time values indexed by k (e.g., PES(k)) at the servo sample frequency $f_s$. In other embodiments, the servo control system may employ up-sampling such that the discrete time values indexed by k are processed at a multiple of the servo sample frequency (N$f_s$). In this embodiment, the first discrete-time sinusoid 40 is generated at the up-sampled frequency and added to the first control signal u1(k) also generated at the up-sampled frequency.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a head;
   a disk comprising a plurality of servo tracks, wherein each servo track comprises a plurality of servo sectors;
   an actuator configured to actuate the head over the disk, wherein the actuator comprises a frequency response;
   control circuitry comprising a servo control system configured to control the actuator, the control circuitry configured to:
   sample the servo sectors at a servo sample frequency $f_s$ to generate a position error signal PES(k);
   filter the PES(k) with a compensator to generate a first control signal u1(k);
   add a first discrete-time sinusoid comprising a sinusoid frequency of $f_s+\Delta f$ to the first control signal u1(k) to generate a second control signal u2(k);
   apply the second control signal u2(k) to the actuator;
   determine the frequency response of the actuator at the frequency $|\Delta f|$; and
   determine the frequency response of the actuator at the frequency $f_s+\Delta f$ based at least in part on the frequency response of the actuator at the frequency $|\Delta f|$ and a measured signal of the servo control system when applying the second control signal u2(k) to the actuator.

2. The disk drive as recited in claim 1, wherein the frequency $\Delta f$ is one of a positive value and a negative value.

3. The disk drive as recited in claim 1, wherein the actuator comprises a voice coil motor.

4. The disk drive as recited in claim 1, wherein the actuator comprises a microactuator.

5. The disk drive as recited in claim 1, wherein the control circuitry is further configured to determine the frequency response of the actuator at the frequency $f_s+\Delta f$ based on a frequency domain representation of the PES(k) at the frequency $|\Delta f|$ when applying the second control signal u2(k) to the actuator.

6. The disk drive as recited in claim 5, wherein the control circuitry is further configured to determine the frequency response of the actuator at the frequency $f_s+\Delta f$ based on a second discrete-time sinusoid comprising a sinusoid frequency of $|\Delta f|$.

7. The disk drive as recited in claim 6, wherein the control circuitry is further configured to determine the frequency response of the actuator at the frequency $f_s+\Delta f$ based on:

$$P(f_s + \Delta f) = \frac{PES(|\Delta f|)}{S_2(|\Delta f|)}(1 + P(|\Delta f|)C(|\Delta f|))$$

where:
   $P(f_s+\Delta f)$ represents the frequency response of the actuator at the frequency $f_s+\Delta f$;
   $PES(|\Delta f|)$ represents the frequency domain representation of the PES(k) at the frequency $|\Delta f|$ when applying the second control signal u2(k) to the actuator;
   $S_2(|\Delta f|)$ represents a frequency domain representation of the second sinusoid;
   $P(|\Delta f|)$ represents the frequency response of the actuator at the frequency $|\Delta f|$; and
   $C(|\Delta f|)$ represents a frequency response of the servo compensator at the frequency $|\Delta f|$.

8. The disk drive as recited in claim 1, wherein the control circuitry is further configured to determine the frequency response of the actuator at the frequency $f_s+\Delta f$ based on a frequency domain representation of the first control signal u1(k) at the frequency $|\Delta f|$ when applying the second control signal u2(k) to the actuator.

9. The disk drive as recited in claim 8, wherein the control circuitry is further configured to determine the frequency response of the actuator at the frequency $f_s+\Delta f$ based on a second discrete-time sinusoid comprising a sinusoid frequency of $|\Delta f|$.

10. The disk drive as recited in claim 9, wherein the control circuitry is further configured to determine the frequency response of the actuator at the frequency $f_s+\Delta f$ based on:

$$P(f_s + \Delta f) = \frac{U1(|\Delta f|)}{S_2(|\Delta f|)} \left[ \frac{1 + P(|\Delta f|)C(|\Delta f|)}{C(|\Delta f|)} \right]$$

where:
- $P(f_s+\Delta f)$ represents the frequency response of the actuator at the frequency $f_s+\Delta f$;
- $U1(|\Delta f|)$ represents the frequency domain representation of the first control signal $u1(k)$ at the frequency $|\Delta f|$ when applying the second control signal $u2(k)$ to the actuator;
- $S_2(|\Delta f|)$ represents a frequency domain representation of the second sinusoid;
- $P(|\Delta f|)$ represents the frequency response of the actuator at the frequency $|\Delta f|$; and
- $C(|\Delta f|)$ represents a frequency response of the servo compensator at the frequency $|\Delta f|$.

11. The disk drive as recited in claim 9, wherein the control circuitry is further configured to determine the frequency response of the actuator at the frequency $f_s+\Delta f$ based on:

$$P(f_s + \Delta f) = \frac{U1(|\Delta f|)}{S_2(|\Delta f|)} P(|\Delta f|)$$

where:
- $P(f_s+\Delta f)$ represents the frequency response of the actuator at the frequency $f_s+\Delta f$;
- $U1(|\Delta f|)$ represents the frequency domain representation of the first control signal $u1(k)$ at the frequency $|\Delta f|$ when applying the second control signal $u2(k)$ to the actuator;
- $S_2(|\Delta f|)$ represents a frequency domain representation of the second sinusoid; and
- $P(|\Delta f|)$ represents the frequency response of the actuator at the frequency $|\Delta f|$.

12. A method of operating a disk drive comprising a servo control system for controlling an actuator for actuating a head over a disk, wherein the actuator comprises a frequency response, the method comprising:
- sampling servo sectors on a disk at a servo sample frequency $f_s$ to generate a position error signal $PES(k)$;
- filtering the $PES(k)$ with a compensator to generate a first control signal $u1(k)$;
- adding a first discrete-time sinusoid comprising a sinusoid frequency of $f_s+\Delta f$ to the first control signal $u1(k)$ to generate a second control signal $u2(k)$;
- applying the second control signal $u2(k)$ to the actuator;
- determining the frequency response of the actuator at the frequency $|\Delta f|$; and
- determining the frequency response of the actuator at the frequency $f_s+\Delta f$ based at least in part on the frequency response of the actuator at the frequency $|\Delta f|$ and a measured signal of the servo control system when applying the second control signal $u2(k)$ to the actuator.

13. The method as recited in claim 12, wherein the frequency $\Delta f$ is one of a positive value and a negative value.

14. The method as recited in claim 12, wherein the actuator comprises a voice coil motor.

15. The method as recited in claim 12, wherein the actuator comprises a microactuator.

16. The method as recited in claim 12, further comprising determining the frequency response of the actuator at the frequency $f_s+\Delta f$ based on a frequency domain representation of the $PES(k)$ at the frequency $|\Delta f|$ when applying the second control signal $u2(k)$ to the actuator.

17. The method as recited in claim 16, further comprising determining the frequency response of the actuator at the frequency $f_s+\Delta f$ based on a second discrete-time sinusoid comprising a sinusoid frequency of $|\Delta f|$.

18. The method as recited in claim 17, further comprising determining the frequency response of the actuator at the frequency $f_s+\Delta f$ based on:

$$P(f_s + \Delta f) = \frac{PES(|\Delta f|)}{S_2(|\Delta f|)}(1 + P(|\Delta f|)C(|\Delta f|))$$

where:
- $P(f_s+\Delta f)$ represents the frequency response of the actuator at the frequency $f_s+\Delta f$;
- $PES(|\Delta f|)$ represents the frequency domain representation of the $PES(k)$ at the frequency $|\Delta f|$ when applying the second control signal $u2(k)$ to the actuator;
- $S_2(|\Delta f|)$ represents a frequency domain representation of the second sinusoid;
- $P(|\Delta f|)$ represents the frequency response of the actuator at the frequency $|\Delta f|$; and
- $C(|\Delta f|)$ represents a frequency response of the servo compensator at the frequency $|\Delta f|$.

19. The method as recited in claim 12, further comprising determining the frequency response of the actuator at the frequency $f_s+\Delta f$ based on a frequency domain representation of the first control signal $u1(k)$ at the frequency $|\Delta f|$ when applying the second control signal $u2(k)$ to the actuator.

20. The method as recited in claim 19, further comprising determining the frequency response of the actuator at the frequency $f_s+\Delta f$ based on a second discrete-time sinusoid comprising a sinusoid frequency of $|\Delta f|$.

21. The method as recited in claim 20, further comprising determining the frequency response of the actuator at the frequency $f_s+\Delta f$ based on:

$$P(f_s + \Delta f) = \frac{U1(|\Delta f|)}{S_2(|\Delta f|)} \left[ \frac{1 + P(|\Delta f|)C(|\Delta f|)}{C(|\Delta f|)} \right]$$

where:
- $P(f_s+\Delta f)$ represents the frequency response of the actuator at the frequency $f_s+\Delta f$;
- $U1(|\Delta f|)$ represents the frequency domain representation of the first control signal $u1(k)$ at the frequency $|\Delta f|$ when applying the second control signal $u2(k)$ to the actuator;
- $S_2(|\Delta f|)$ represents a frequency domain representation of the second sinusoid;
- $P(|\Delta f|)$ represents the frequency response of the actuator at the frequency $|\Delta f|$; and
- $C(|\Delta f|)$ represents a frequency response of the servo compensator at the frequency $|\Delta f|$.

22. The method as recited in claim 20, further comprising determining the frequency response of the actuator at the frequency $f_s+\Delta f$ based on:

$$P(f_s + \Delta f) = \frac{U1(|\Delta f|)}{S_2(|\Delta f|)} P(|\Delta f|)$$

where:
- $P(f_s+\Delta f)$ represents the frequency response of the actuator at the frequency $f_s+\Delta f$;
- $U1(|\Delta f|)$ represents the frequency domain representation of the first control signal $u1(k)$ at the frequency $|\Delta f|$ when applying the second control signal $u2(k)$ to the actuator;
- $S_2(|\Delta f|)$ represents a frequency domain representation of the second sinusoid; and
- $P(|\Delta f|)$ represents the frequency response of the actuator at the frequency $|\Delta f|$.

\* \* \* \* \*